United States Patent [19]

Stupp

[11] Patent Number: 5,774,293
[45] Date of Patent: Jun. 30, 1998

[54] MAGNETIC RECORDING AND/OR REPRODUCING APPARATUS WITH AUTOMATIC CONTROL OF SEPARATION BETWEEN THE MAGNETIC HEAD AND THE RECORD CARRIER SURFACE

[75] Inventor: Steven E. Stupp, Mountain View, Calif.

[73] Assignee: U.S. Philips Corporation, New York, N.Y.

[21] Appl. No.: 656,745

[22] Filed: Jun. 3, 1996

[30] Foreign Application Priority Data

Jun. 1, 1995 [EP] European Pat. Off. .............. 95201439

[51] Int. Cl.⁶ ................................................. G11B 15/48
[52] U.S. Cl. ............................................ 360/75; 360/109
[58] Field of Search ..................... 360/75, 77.02, 360/77.03, 77.12, 77.13, 109, 105, 104, 84, 85

[56] References Cited

U.S. PATENT DOCUMENTS

| | | | |
|---|---|---|---|
| 3,761,646 | 9/1973 | Beauviala | 360/75 X |
| 4,931,887 | 6/1990 | Hedge et al. | 360/75 |
| 4,944,028 | 7/1990 | Iijima et al. | 360/75 X |
| 5,031,055 | 7/1991 | Yanagisawa | 360/75 |
| 5,223,992 | 6/1993 | Mitsuhashi | 360/75 |
| 5,457,585 | 10/1995 | Christensen | 360/75 |
| 5,471,352 | 11/1995 | Fujita et al. | 360/75 X |
| 5,602,688 | 2/1997 | Yokoyama et al. | 360/75 X |

FOREIGN PATENT DOCUMENTS

| | | |
|---|---|---|
| 61-220114 | 9/1986 | Japan . |
| 1-35719 | 2/1989 | Japan ..................................... 360/75 |
| 2-273313 | 11/1990 | Japan ..................................... 360/75 |
| 3-292610 | 12/1991 | Japan . |
| 5-166153 | 7/1993 | Japan ..................................... 360/75 |

*Primary Examiner*—Aristotelis M. Psitos
*Assistant Examiner*—Larry T. Cullen
*Attorney, Agent, or Firm*—Leroy Eason; Michael E. Belk

[57] ABSTRACT

A recording and/or reproducing apparatus for a magnetic record carrier such as a tape or disk. The apparatus includes a magnetic recording/reproducing head, a guide for positioning the face of the head relative to a recording surface of the record carrier, and an actuator for moving the head relative to the guide in a direction normal to the recording surface. The actuator is driven by a control unit which receives a control signal from a detector upon detection thereby of frictional contact between the face of the magnetic head and the recording surface. That causes the control unit to cause the actuator to move the head so as to increase the distance between the face thereof and the recording surface.

12 Claims, 2 Drawing Sheets

MAGNETIC RECORDING AND/OR REPRODUCING APPARATUS WITH AUTOMATIC CONTROL OF SEPARATION BETWEEN THE MAGNETIC HEAD AND THE RECORD CARRIER SURFACE

BACKGROUND OF THE INVENTION

The invention relates to an apparatus for recording and/or reproducing information on a magnetic medium, A conventional apparatus of this general type is known from JP-A-3-292 610 (herewith incorporated by reference). The known apparatus comprises a slider with a guiding surface for positioning the head face of a magnetic head relative to a surface of a magnetic disc. The magnetic head is movable relative to the guiding surface of the slider in a direction parallel to the normal to the head face by means of a piezo-electric actuator. Control means are provided to drive the actuator. The actuator is used to bring the magnetic head to a retracted position in which the head is retracted relative to the guiding surface of the slider, and to protruding position in which the head protrudes from the guiding surface of the slider. In the retracted position there is no contact between the head face and the disc when the disc stops. In the protruding position the head face is nearer to the disc than the guiding surface when the disc rotates steadily and the slider floats due to air pressure caused by rotation of the disc. A drawback of the known apparatus is that the distance between the head face and the surface of the disc is not controlled during recording and/or reproducing information. Therefore, other factors such as creep of the piezo-electric actuator and abrasion of the slider surface may cause this distance to become so small that friction occurs between the head face and the disc, causing wear of the magnetic head.

SUMMARY OF THE INVENTION

It is an object of the invention to increase the life of the magnetic head. To achieve this object, the apparatus according to the invention is characterized in that the apparatus comprises detection means for generating a signal when contact occurs between the head face and the main surface of the medium, and applying the signal to control means adapted to drive the actuator so as to cause a reverse movement of the magnetic head. Due to these measures contact between the head face and the medium will result in a retraction of the magnetic head from the medium. After some time wear of the guide may result again in contact between the head face and the medium. However, on detecting the contact the head will be retracted again so that contact will only occur during a part of the period of time during which the apparatus is operative. Since wear of the magnetic head is mainly caused by friction due to said contact, the wear is reduced and the total life of the magnetic head is increased.

An embodiment of the apparatus in accordance with the invention is characterized in that the control means are further adapted to drive the actuator to cause a forward movement of the magnetic head after the reverse movement of the magnetic head. The forward movement of the magnetic head repetitively causes contact to be established between the head and the medium after certain time intervals, so that the distance between the head face and the main surface of the medium can be controlled even with actuators which suffer from hysteresis or "creep".

An embodiment of the apparatus in accordance with the invention is characterized in that the reverse movement comprises a given displacement. Due to this measure the distance between the head face and the medium surface facing it can be kept within certain limits. This is important because the quality of recording and/or reproduction of signals on/from the medium depends strongly on said distance.

An embodiment of the apparatus in accordance with the invention is characterized in that the forward movement provides a displacement which is a linear function of time. This measure is easy to realize and offers the advantage that the average of said distance over time can easily be calculated from the time interval between the start of the forward movement and the detection of contact between the head face and the medium.

An embodiment of the apparatus in accordance with the invention is characterized in that the detection means comprise a temperature sensitive sensor which is thermally coupled to the head face. It has been found that due to friction resulting from contact between the head face and the medium the temperature of the head face significantly increases. In applications where the head moves relative to the medium with a comparatively high speed, such as in Hard Disk Drives or Helical Scan Systems, this increase of temperature can be as high as 60° C. It has been estimated that the increase of the temperature of the head face will cause the temperature of a sensing element mounted 10–50 $\mu$m from the head face inside the magnetic head to increase about 10° C. within 1 ms. Such a sudden increase of temperature of 10° C. can easily be detected with a thermocouple or by measuring the change in resistivity of an MRE sensor. Hence, friction between the head face and the medium can be detected with a temperature sensitive sensor.

In case the head is internally heated, for instance due to an electric current through the MRE element, and heat conduction of the head to its surroundings is small, the temperature of the head may also (temporarily) decrease due to the establishment of a contact between the head and the tape. In this case the additional heating of the head due to friction is less than the cooling due to the contact between the head and the tape. However, a temperature change results from contact between the head and the tape and so a signal can be generated. It depends on the particular embodiment whether a temperature increase or temperature decrease will result from a contact of the head and the tape.

An embodiment of the apparatus in accordance with the invention is characterized in that the detection means comprise a Barkhausen noise sensor. When the magnetic head comprises a sensor which is based on the magneto resistive effect (MRE element), this MRE element will produce so called Barkhausen noise when reading information from a magnetic medium. The amount of Barkhausen noise is dependent on the temperature of the MRE element. Hence, friction between the head and the medium can be detected by monitoring said amount.

An embodiment of the apparatus in accordance with the invention is characterized in that the actuator is a piezo-electric actuator. A piezo-electric actuator has the advantages that it can be very small and that its operation is hardly affected by external forces such as the centrifugal forces caused by rotation of the head drum in a helical scan system. Positioning problems normally resulting from properties of a piezo-electric actuator, such as creep and hysteresis, can be handled with the measures of the above mentioned embodiments.

BRIEF DESCRIPTION OF THE DRAWINGS

Embodiments of the invention are represented in the drawing and will be further described hereafter, in which drawings.

DETAILED DESCRIPTION OF THE PREFERRED EMBODIMENTS

Figure 1:
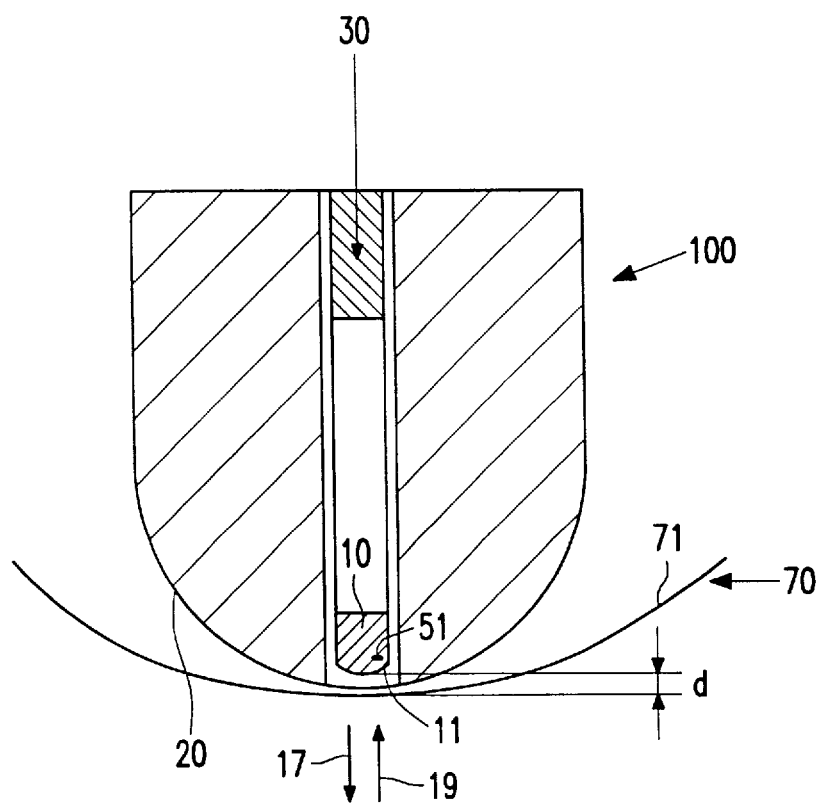
FIG. 1 shows a top view of a head unit of an embodiment of the apparatus according to the invention.

FIG. 1 shows a top view of a head unit 100 of an apparatus for recording and/or reproducing on a magnetic medium, in this case a magnetic tape 70. The head unit 100 comprises a magnetic head 10 having a head face 11 and being mounted near a guide 20. The guide 20 positions a main surface 71 of the magnetic tape 70 relative to the magnetic head 10. An actuator 30, in this case a piezo-electric actuator, is connected to the magnetic head 10 and the guide 20. The actuator 30, which may also be an electromechanical or an electrostrictive actuator, is mounted such that the magnetic head 10 can be moved relative to the guide 20 in a forward direction 17 coinciding with the normal to the head face 11 and in a reverse direction 19 opposite to the normal to the head face. Said movements will be referred to as forward movement and reverse movement, respectively.

Figure 2:
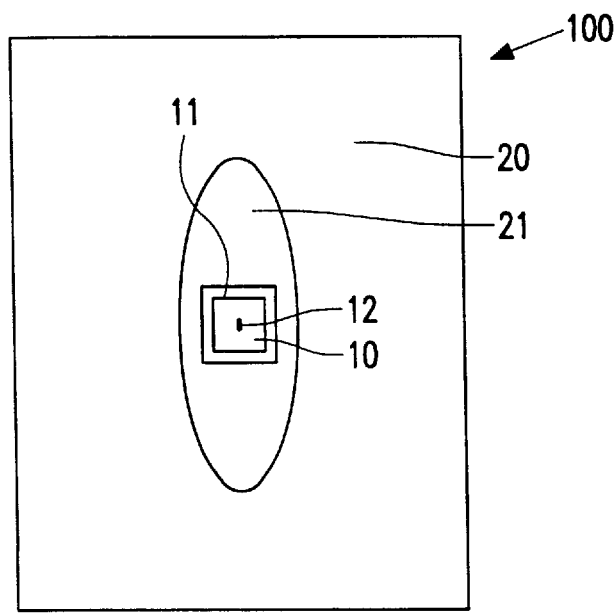
FIG. 2 shows a front view of the head unit of FIG. 1.

FIG. 2 shows a front view of the head unit 100 of FIG. 1. The magnetic head 10 has a head face 11 with a magnetic gap 12 for recording and/or reproducing information on the tape 70. The guide 20 surrounds the magnetic head 10. The guide 20 may wear due to the sliding contact with the tape 70 (see FIG. 1), especially in an area 21 near the magnetic head 10.

Figure 3:
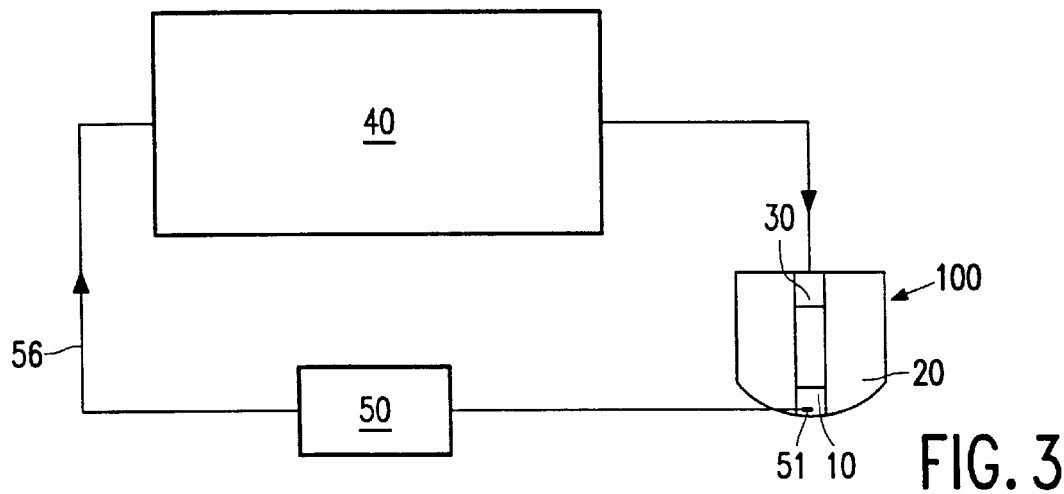
FIG. 3 shows a block diagram of the apparatus according the invention.

FIG. 3 shows a block diagram of the apparatus according to the invention. Besides the head unit 100 comprising the magnetic head 10, the guide 20 and the actuator 30, the apparatus comprises control means 40 for driving the actuator 30 and detection means comprising a sensor 51 and measuring means 50. The detection means are constructed to generate a signal in response to a contact between the head face 11 and said main surface 71 of the tape 70. The sensor 51 may be a temperature sensitive sensor such as Barhausen noise sensor. In this case an MRE element 51 in a the magnetic head 10 is used as a Barkhausen noise sensor. When reading information from a medium the MRE element 51 produces Barkhausen noise and the amount of noise is dependent on the temperature of the MRE element. The measuring means 50 are constructed to measure the amount of Barkhausen noise and to generate a signal in response to a detection predetermined increase of said amount. Said predetermined increase is chosen so as to correspond to the increase of the temperature of the MRE element 51 caused by friction between the head face 11 and the medium. Further, the apparatus comprises a wire connection 56 for transferring the detection signal to the control means 40. The control means 40 are constructed to drive the actuator 30 so as to cause a reverse movement 60 of the magnetic head 10 in response to reception of said signal. Due to these measures friction between the head face 11 and the tape 70 will result in a retraction of the magnetic head 10 from the tape 70. After some time, however wear of the guide 20 may again result in contact friction between the head face 11 and the medium. However, on detecting such contact, the head 10 will be retracted again and so friction will only occur during a part of the period of time during which the apparatus is operative. Since wear of the magnetic head 10 is mainly caused by such friction, this wear is reduced and the total lifetime of the magnetic head 10 is increased.

Figure 4:
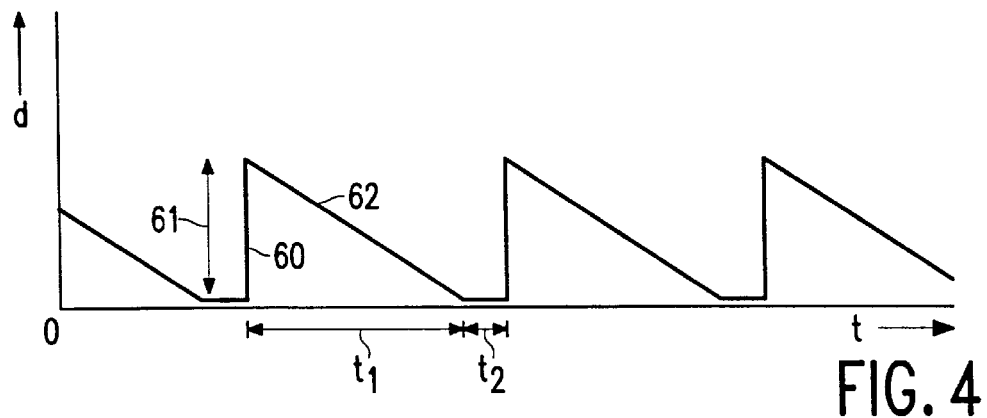
FIG. 4 shows the distance between a head face and a main surface of a medium as a function of time.

FIG. 4 shows the distance d between a head face and a main surface of a medium as a function of time in a preferred embodiment of the invention. This medium can be the tape 70 or a magnetic disk. In this embodiment the control means 40 are further constructed to drive the actuator 30 so as to cause a forward movement 62 of the magnetic head 30 following a reverse movement 60. The forward movement 62 of the magnetic head 10 causes contact between the head face 11 and the tape 70 after a certain time interval t1, so that the distance d can be controlled even when using actuators which suffer from hysteresis or creep. Because of the detection of the contact and the resulting reverse movement 60, the friction will only be present during a short time interval t2. The fraction of the operating time during which friction actually occurs will therefore be limited to $t2/(t1+t2)$, so that the life of the magnetic head will be extended by a factor $(t1+t2)/t2$. Actual values may be t1=59 s and t2=1 s, so that the life will be extended by a factor 60. Preferably, the reverse movement 60 comprises a given displacement 61. In this way the distance d between the head face 11 and the medium surface 71 facing the magnetic head 10 can be kept within certain limits. This is important because the quality of recording and/or reproduction of signals on/from the medium depends strongly on said distance d. Preferably, the forward movement 62 comprises a displacement which is a linear function of time. This is easy to realize and offers the advantage that the average of said distance d over time can easily be calculated from the time interval t1 between the start of the forward movement 60 and the detection of contact between the head face 11 and the medium 70.

Figure 5:
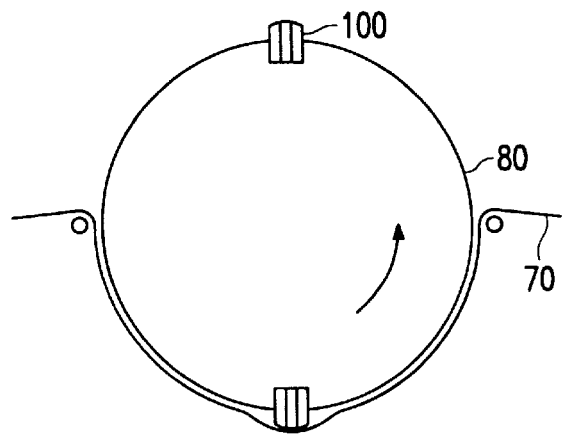
FIG. 5 shows a top view of a helical scan drum of an apparatus according to the invention.

FIG. 5 shows a top view of a helical scan drum 80 of an apparatus according to the invention. The drum 80 carries two head units 100. The head units 100 are protruding from the drum to obtain a good contact between the magnetic tape 70 and the head units 100. In such a helical scan system the speed of the magnetic head 10 relative to the tape 70 is in the order of 10 m/s. At such a speed the mechanical wear of the head is so large that an MRE based head cannot be used because in an MRE based head the throat (or yoke) height is so small (of the order of micrometers) that after some wear the throat has completely disappeared. With the invention the wear of the magnetic head can be limited so that an MRE based head can be used. Because an MRE based head has a higher sensitivity than conventional heads the recording density can be increased significantly. Moreover, the system becomes similar to that of current hard disc systems so that helical scan systems can benefit from the developments of techniques and recording materials in the hard disc area.

Hereinbefore the invention has been described for embodiments having magnetic heads 10 with a single magnetic gap 12. It is to be noted that also magnetic heads with multiple gaps 12 may be used. Such multiple-gap heads are known, for example, from the DCC system and can be manufactured very well in the thin film technology used for making MRE based heads. Such a multiple-gap system allows features such as tracking with a tracking gap or parallel recording/reproducing to obtain higher data rates. The invention can be used in all recording systems in which a head is moved relative to a medium and the head to medium distance is in the contact or near-contact region.

What is claimed is:

1. An apparatus for recording and/or reproducing information on a recording surface of an magnetic record carrier, comprising:

a magnetic head having a face with a magnetic gap therein;

a guide for positioning the magnetic head so that the face thereof is in close proximity to the recording surface of the record carrier;

an actuator coupled to said head for moving it in a direction normal to said recording surface so as to change the separation distance between the face of said head and said recording surface, the direction of said movement being forward going toward the recording surface and being reverse going away from said recording surface;

detection means coupled to said head for generating a detection signal when the face of said head comes into contact with said recording surface; and control means coupled to said detection means and responsive to said detection signal to provide a control signal to the actuator which is responsive thereto to move said head in said reverse direction so as to increase the separation distance between the face of said head and said recording surface.

2. An apparatus as claimed in claim 1, wherein the control signal provided by said control means further causes said actuator to move said head in the forward direction for a selected interval following completion of movement thereof in the reverse direction.

3. An apparatus as claimed in claim 2, wherein movement of said head in the reverse direction is continued until said separation distance reaches a given value.

4. An apparatus as claimed in claim 3, wherein movement of said head in the forward direction comprises displacement thereof as a linear function of time.

5. An apparatus as claimed in claim 2, wherein movement of said head in the forward direction comprises displacement thereof as a linear function of time.

6. An apparatus as claimed in claim 5, wherein said detection means comprises a temperature sensitive sensor which is thermally coupled to the face of the magnetic head.

7. An apparatus as claimed in claim 2, wherein said detection means comprises a Barkhausen noise sensor.

8. An apparatus as claimed in claim 1, wherein said detection means comprises a Barkhausen noise sensor.

9. An apparatus as claimed in claim 8, wherein said actuator comprises a piezeo-electric device.

10. An apparatus as claimed in claim 1, wherein movement of said head in the reverse direction is continued until said separation distance reaches a given value.

11. An apparatus as claimed in claim 1, wherein said detection means comprises a temperature sensitive sensor which is thermally coupled to the face of the magnetic head.

12. An apparatus as claimed in claim 1, wherein the actuator comprises a piezeo-electric device.

* * * * *